(12) United States Patent
Liu et al.

(10) Patent No.: US 11,911,698 B2
(45) Date of Patent: Feb. 27, 2024

(54) ANIMATION DISPLAY METHOD AND APPARATUS, STORAGE MEDIUM, AND ELECTRONIC DEVICE

(71) Applicant: TENCENT TECHNOLOGY (SHENZHEN) COMPANY LIMITED, Guangdong (CN)

(72) Inventors: Zhihong Liu, Guangdong (CN); Chao Liang, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 307 days.

(21) Appl. No.: 17/451,603

(22) Filed: Oct. 20, 2021

(65) Prior Publication Data

US 2022/0054937 A1    Feb. 24, 2022

Related U.S. Application Data

(63) Continuation of application No. PCT/CN2020/121467, filed on Oct. 16, 2020.

(30) Foreign Application Priority Data

Nov. 22, 2019   (CN) .......................... 201911159614.3

(51) Int. Cl.
*A63F 13/52*    (2014.01)
*A63F 13/85*    (2014.01)
(Continued)

(52) U.S. Cl.
CPC .............. *A63F 13/52* (2014.09); *A63F 13/85* (2014.09); *G06F 3/04842* (2013.01); *G06T 13/80* (2013.01)

(58) Field of Classification Search
CPC .......... A63F 13/52; A63F 13/85; A63F 13/22; A63F 13/48; A63F 2300/305;
(Continued)

(56) References Cited

U.S. PATENT DOCUMENTS

2006/0252533 A1* 11/2006 Sakaguchi .............. A63F 13/10
463/31
2008/0102949 A1*  5/2008 Hasegawa ............. A63F 13/533
463/31
(Continued)

FOREIGN PATENT DOCUMENTS

CN        1079435524      4/2016
CN        106681583 A     5/2017
(Continued)

OTHER PUBLICATIONS

Men's Commentary "Honor of Kings: A must-see game guide for beginners, to help you get started as soon as possible" 1 page, Nov. 20, 2017. https://v.qq.com/x/page/u0507jcr4q4 .html.
(Continued)

*Primary Examiner* — Pierre E Elisca
(74) *Attorney, Agent, or Firm* — ARENTFOX SCHIFF LLP

(57) ABSTRACT

An animation display method is provided. In the method, a first display area is displayed on a game setting interface of a game application. The first display area is configured to display a first operation flow in the game application. A first picture is displayed in the first display area when the first display area is not selected. The first picture is at least one display picture in the first operation flow. A first animation is played in the first display area when the first display area is selected. The first animation plays at least one group of display pictures in the first operation flow.

20 Claims, 6 Drawing Sheets

(51) Int. Cl.
    *G06F 3/04842* (2022.01)
    *G06T 13/80* (2011.01)
(58) Field of Classification Search
    CPC ............... A63F 13/533; A63F 13/5375; G06F 3/04842; G06T 13/80; G06T 2200/24
    USPC .......................................................... 463/31
    See application file for complete search history.

(56) References Cited

U.S. PATENT DOCUMENTS

| | | | |
|---|---|---|---|
| 2011/0175801 A1 | 7/2011 | Markovic et al. | |
| 2012/0001900 A1* | 1/2012 | Michiguchi | G06T 15/00 345/419 |
| 2012/0309533 A1* | 12/2012 | Horita | A63F 13/211 463/36 |
| 2013/0059634 A1 | 3/2013 | Behmaram-Mosavat et al. | |
| 2013/0267309 A1* | 10/2013 | Robbins | A63F 9/24 463/31 |
| 2015/0314201 A1 | 11/2015 | Wickenkamp et al. | |
| 2017/0232348 A1* | 8/2017 | Williams | A63F 13/22 463/31 |
| 2022/0280870 A1* | 9/2022 | Xiao | A63F 13/847 |

FOREIGN PATENT DOCUMENTS

| | | |
|---|---|---|
| CN | 1086197234 | 10/2018 |
| CN | 108965599 A | 12/2018 |
| CN | 109499060 A | 3/2019 |
| CN | 109701278 A | 5/2019 |
| CN | 110413916 A | 11/2019 |
| CN | 1108825394 | 3/2020 |
| WO | 2019216999 A1 | 11/2019 |

OTHER PUBLICATIONS

Classmate Zhou Talks about Games "Go Karting Mobile Game: Advanced Gas Gathering Techniques" 2 pages, May 19, 2019, https://v.qq.com/x/page/p0872rom96m.html.
Office Action dated Sep. 23, 2020 issued in corresponding Chinese patent application 201911169614.3 (12 pages).
Office Action dated Mar. 31, 2021 issued in corresponding Chinese patent application 201911159614.3 with English translation (7 pages).
International Search Report dated Jan. 15, 2021 issued in PCT/CN2020/121467 (11 pages).
Supplementary European Search Report issued in Application No. 20888983.2, dated Sep. 19, 2022, 12 pages.

* cited by examiner

ANIMATION DISPLAY METHOD AND APPARATUS, STORAGE MEDIUM, AND ELECTRONIC DEVICE

RELATED APPLICATIONS

This application is a continuation of International Application No. PCT/CN2020/121467, entitled "ANIMATION DISPLAYING METHOD AND DEVICE, STORAGE MEDIUM, AND ELECTRONIC DEVICE" and filed on Oct. 16, 2020, which claims priority to Chinese Patent Application No. 2019111596143, entitled "ANIMATION DISPLAY METHOD AND APPARATUS, STORAGE MEDIUM, AND ELECTRONIC DEVICE" and filed on Nov. 22, 2019. The entire disclosures of the prior application are hereby incorporated by reference in their entirety.

FIELD OF THE TECHNOLOGY

This disclosure relates to the field of computers, including to an animation display method and apparatus, a-non-transitory computer-readable storage medium, and an electronic device.

BACKGROUND OF THE APPLICATION

In the field of games, there exist a variety of data and parameter information. To enable a game player to understand and learn the information quickly, a function module of game guidance is set in each game.

However, the information is mostly described by using a prompt box or in a picture display manner in the game guidance in the related art to enable the game player to understand specific roles. However, for some information, for example, to describe a gameplay mode, not only a datum or a parameter of the gameplay mode needs to be described, but also an entire process of the gameplay mode needs to be described.

For further example, it is assumed that the game guidance guides the game player to further understand a "Fire" setting interface. Specifically, the "Fire" may be divided into a primary lire mode and an advanced fire mode, but the game player may hardly understand the specific difference between the two modes only via static language description or a display manner of a static picture.

That is, there exist a problem in the related art that the display manner of the game guidance is single.

For the foregoing problem, no effective solution has been provided yet.

SUMMARY

According to various embodiments of this disclosure, an animation display method and apparatus, a non-transitory computer-readable storage medium, and an electronic device are provided.

According to an aspect of the embodiments of this disclosure, an animation display method is provided. In the method, a first display area is displayed on a game setting interface of a game application. The first display area is configured to display a first operation flow in the game application. A first picture is displayed in the first display area when the first display area is not selected. The first picture is at least one display picture in the first operation flow. A first animation is played in the first display area when the first display area is selected. The first animation plays at least one group of display pictures in the first operation flow.

According to another aspect of the embodiments of this disclosure, an animation display apparatus including processing circuitry is further provided. The processing circuitry is configured to display a first display area on a game setting interface of a game application. The first display area is configured to display a first operation flow in the game application. The processing circuitry is configured to display a first picture in the first display area when the first display area is not selected. The first picture is at least one display picture in the first operation flow. Further, the processing circuitry is configured to play a first animation in the first display area when the first display area is selected. The first animation plays at least one group of display pictures in the first operation flow.

According to still another aspect of the embodiments of this disclosure, a non-transitory computer-readable storage medium is further provided. The non-transitory computer-readable storage mediums stores instructions which when executed by at least one processor cause the at least one processor to perform a method in which a first display area is displayed on a game setting interface of a game application. The first display area is configured to display a first operation flow in the game application. In the method, a first picture is displayed in the first display area when the first display area is not selected. The first picture is at least one display picture in the first operation flow. A first animation is played in the first display area when the first display area is selected. The first animation plays at least one group of display pictures in the first operation flow.

According to yet another aspect of the embodiments of this disclosure, an electronic device is further provided, including a memory, one or more processors, and computer-readable instructions that are stored in the memory and executable on the one or more processors, the one or more processors performing the foregoing animation display method when the computer-readable instructions are executed.

Details of one or more embodiments of this disclosure are provided in the following accompanying drawings and descriptions. Based on the specification, the accompanying drawings, and the claims of this disclosure, other features, objectives, and advantages of this disclosure become more obvious.

BRIEF DESCRIPTION OF THE DRAWINGS

To describe the technical solutions in the embodiments of this disclosure more clearly, the accompanying drawings required for describing the embodiments are briefly described hereinafter. Apparently, the accompanying drawings in the following descriptions show merely some embodiments of this disclosure, and a person of ordinary skill in the art may obtain other accompanying drawings according to these accompanying drawings without creative efforts.

DESCRIPTION OF EMBODIMENTS

In order to make a person skilled in the art better understand the solutions of this disclosure, the following describes the technical solutions in the embodiments of this disclosure with reference to the accompanying drawings in the embodiments of this disclosure. It should be understood that the described embodiments are only some of the embodiments of this disclosure rather than all of the embodiments. Other embodiments obtained by a person skilled in the art based on the embodiments of this disclosure shall also fall within the protection scope of this disclosure.

The terms such as "first" and "second" in the specification and claims of this disclosure and in the accompanying drawings are used for distinguishing similar objects and not necessarily used for describing any particular order or sequence. The data termed in such a way are interchangeable in proper circumstances, so that the embodiments of this disclosure described herein can be implemented in orders other than the order illustrated or described herein. In addition, the terms "comprise", "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

Figure 1:
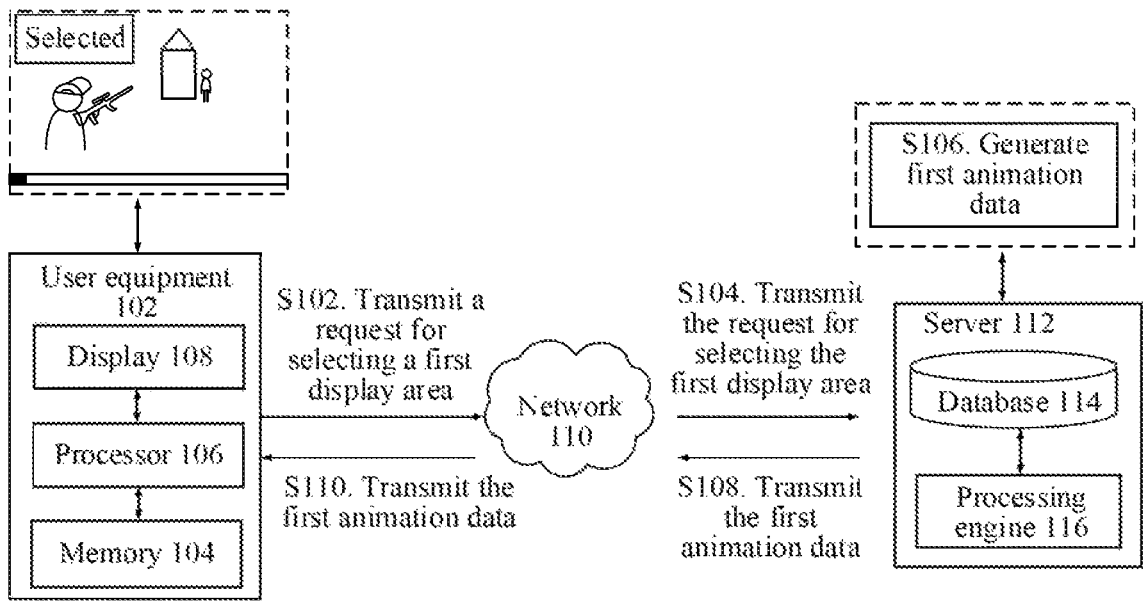
FIG. 1 is a schematic diagram of an application environment of an animation display method according to an embodiment of this disclosure.

According to an aspect of the embodiments of this disclosure, an animation display method is provided. In an implementation, the animation display method is applicable to, but is not limited to, a game system of a hardware environment shown in FIG. 1. The game system may include, but is limited to: a terminal device (or user equipment) 102, a network 110, and a game application server 112. A client (e.g., a game client shown in FIG. 1) of a target game application is run on the terminal device 102, and the target game application is run on the game application server 112 and displays a game screen by using the terminal device 102. The terminal device may include, but is not limited to: a display 108, one or more processors 106, and a memory 104. The display 108 is configured to display a first display area on a setting interface of the target game application; and the one or more processors 106 are configured to obtain the first display area on the setting interface of the target game application and detect an operation instruction e.g., a touch instruction and a selection instruction) in the first display area; and are further configured to perform a corresponding operation based on the detected operation instruction. The memory 104 is configured to store the operation instruction, and a first picture and a first animation in the first display area on the setting interface of the target game application. The game application server 112 herein may include, but is not limited to: a database 114 and a processing engine 116. The processing engine 116 is configured to invoke game processing logic stored in the database 114 to run the target game application, and is further configured to compress first animation data obtained during the running process and transmit the compressed first animation data to the terminal device 102 for display. A progress bar of the game screen shown in FIG. 1 is only used for distinguishing and describing that the screen shows an animation rather than a static picture, which is not specifically limited.

The specific process can include steps S102 to S110. For example, a request that is triggered by performing an operation is obtained and used for selecting the first display area on a display interface displayed on the display 108 of the terminal device 102. The selection request is transmitted to the game application server 112 through the network 110. The game application server 112 obtains the first animation data of the target game application, and transmits the first animation data to the terminal device 102 through the network 110.

In an embodiment, the animation display method is applicable to, but is not limited to, a terminal device, and the terminal device may be, but is not limited to: a mobile phone, a tablet computer, a notebook computer, a PC, and another terminal device that supports running an application client. The server and the terminal device may implement data exchange through, but not limited to, a network, and the network may include, but is not limited to, a wireless network or a wired network. The wireless network includes: Bluetooth, Wi-Fi, and another network implementing wireless communication. The wired network may include, but is not limited to: a wide area network, a metropolitan area network, and a local area network. The foregoing description is merely an example, which is not limited in this embodiment.

Figure 2:
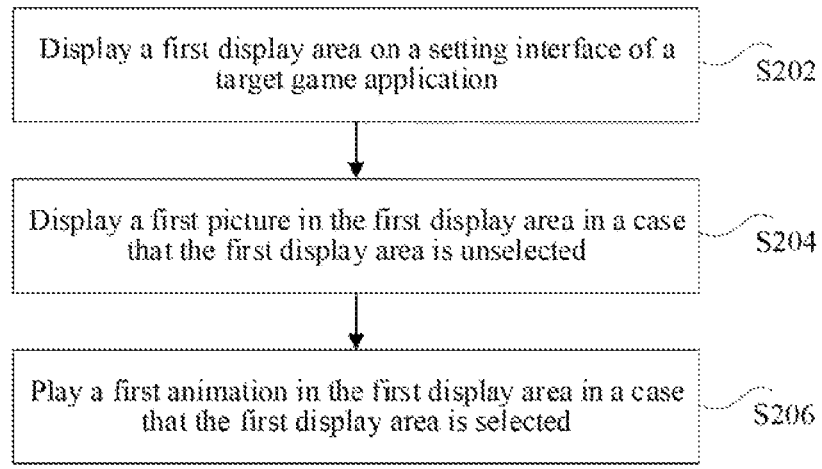
FIG. 2 is a schematic flowchart of an animation display method according to an embodiment of this disclosure.

In an implementation, as shown in FIG. 2, the animation display method can include the following steps.

In step S202, a first display area is displayed on a setting interface of a target game application, the first display area being used for displaying a first operation flow in the target game application.

In step S204, a first picture is displayed in the first display area when the first display area is unselected, the first picture being at least one display picture in the first operation flow.

In step S206, a first animation is played in the first display area when the first display area is selected, the first animation being used for playing at least one group of display pictures in the first operation flow.

In an embodiment, the animation display method is applicable to, but is not limited to, an animation display process of a cloud game application. The cloud game application is a game based on cloud computing. The cloud game application is usually run on a game application server, compresses a corresponding animation in the display area, and directly transmits the compressed animation to a game client through a network, to display the animation to a user object. The animation display method is applicable to, but is not limited to, a process of game guidance, to enable the user object to understand, via the animation display, information to be expressed in the game guidance more intuitively, more detailed, and more easily, thereby achieving a technical effect of making the game guidance more understandable.

Selecting the first display area may include, but is not limited to, at least one of the following: performing a tap operation on a trigger key in the first display area, performing a tap operation on a blank area of the first display area, or performing a slide operation on a specific area of the first display area. In addition, other trigger manners such as voice trigger and gesture trigger may be included, which are not limited in this embodiment. The trigger key may be set in the first display area by using, but not limited to, at least one of the following manners: a pop-up window, a floating layer, an embedded area, and the like. The first picture may be, but is not limited to: a related picture of the display picture out of the first animation, the first display picture of the first animation, the last displayed picture of the first animation, and the like. The group of display pictures may include, but are not limited to: a progress bar, a remaining time value, and the like. The first display area may include, but is not limited to: a play area, a display area, a selected area, a pause area, a fast-forward area, a speed-adjustment area, a mute area, a volume-adjustment area, a close area, and the like.

The first display area is displayed on the setting interface of the target game application; the first picture is displayed in the first display area when the first display area is unselected; and the first animation is played in the first display area when the first display area is selected. The target game application may include, but is not limited to: a shooting game, a racing game, a competition game, and the like. The setting interface may include, but is not limited to: a mode setting interface, an operation setting interface, a parameter setting interface, and the like.

Figure 3:
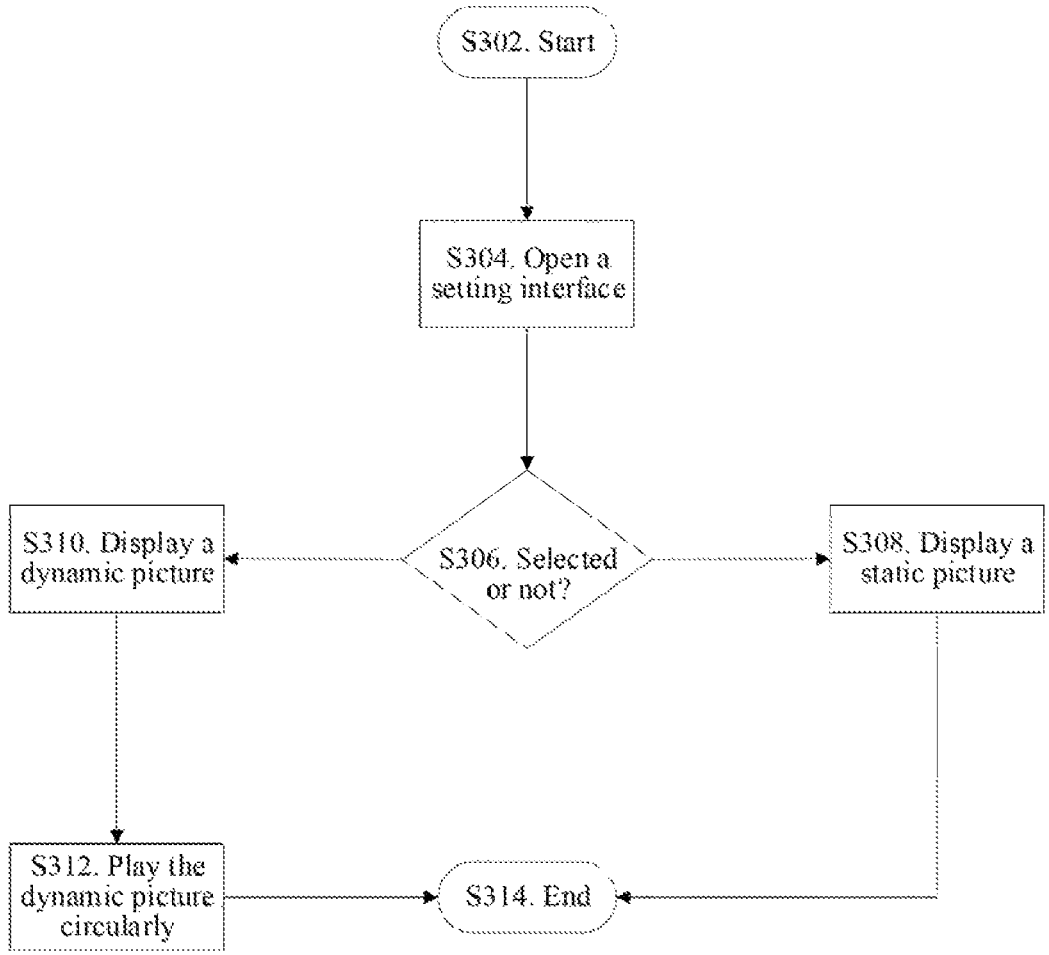
FIG. 3 is a schematic diagram of an animation display method according to an embodiment of this disclosure.

For a further example, the animation display method may be, but is not limited to, shown in FIG. 3. The specific process may include steps S302 to S314. For example, an open instruction for opening the setting interface is performed, and whether there exists a selection instruction is detected. A static picture is displayed when there exists no selection instruction; and a dynamic picture displayed when there exists the selection instruction, and the dynamic picture played circularly. The dynamic picture may include, but is not limited to, a group of display pictures for playing the first operation flow. Assuming that FIG. 3 is set in an operation scenario of a fire mode setting interface in a shooting game, steps S302 to S314 may include, but are not limited to: Open the fire mode setting interface, and detect a selected or unselected fire mode; display a static picture of each mode on the fire mode setting interface when it is detected that no fire mode is selected; and display, when it is detected that an auto-fire mode is selected, a dynamic picture corresponding to the auto-fire mode. The dynamic picture may include, but is not limited to, a plurality of groups of display pictures of the auto-fire mode.

Figure 4:
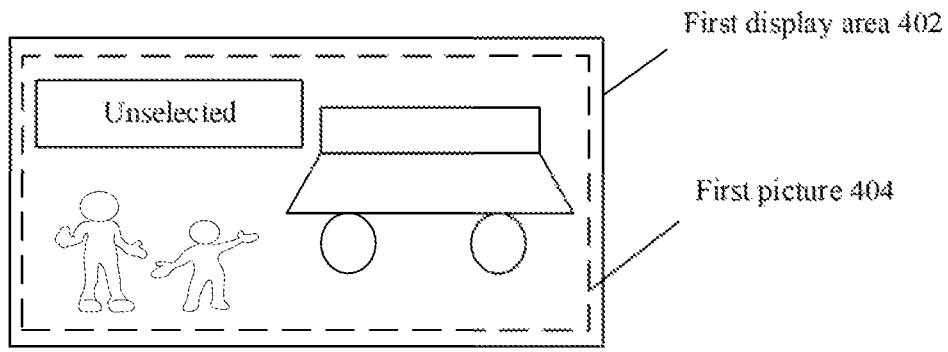
FIG. 4 is a schematic diagram of another animation display method according to an embodiment of this disclosure.

For a further example, it is assumed that a scenario shown in FIG. 4 is guiding a game player to understand what multiplayer driving is. A first display area 402 is displayed on the setting interface of the target game application. When the first display area 402 is not tapped by a touch operation, it is determined that the first display area 402 is in an unselected state, and an unselected identifier may be marked on, but is not limited to, the first display area 402. Further, when the first display area 402 is in the unselected state, a first picture 404 is displayed in the first display area 402, the first picture 404 being used for displaying an operation scenario of the first display area 402, such as an initial step of the multiplayer driving.

Figure 5:
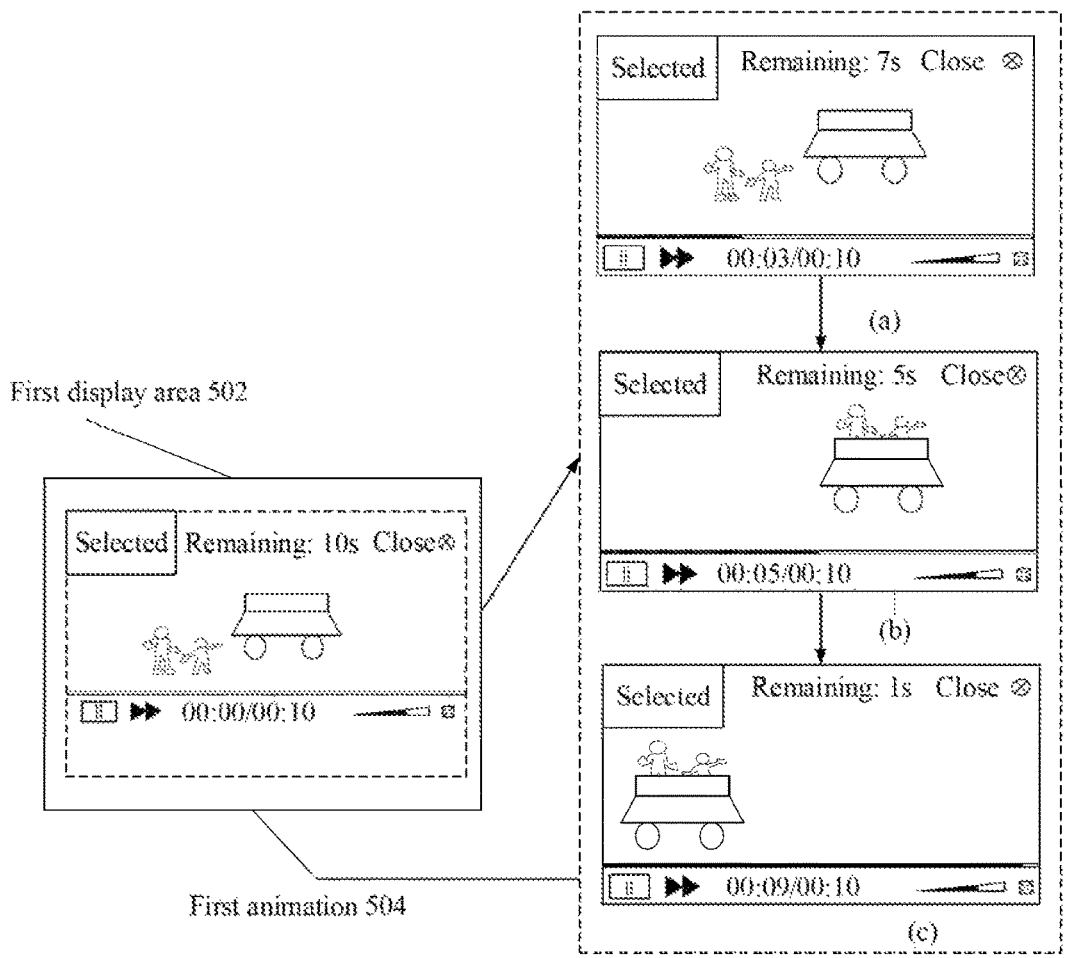
FIG. 5 is a schematic diagram of another animation display method according to an embodiment of this disclosure.

For a further example, it is assumed that a scenario shown in FIG. 5 is guiding a game player to understand what multiplayer driving is. A first display area 502 is displayed on the setting interface of the target game application. When the first display area 502 is not touched, it is determined that the first display area 502 is in a selected state, and a selected identifier may be marked on, but is not limited to, the first display area 502. Further, when the first display area 502 is selected, a first animation 504 is displayed in the first display area 502. The first animation 504 is used for playing a group of display pictures related to the first operation flow, and the display pictures include, but are not limited to, three display pictures (a), (b), and (c) shown in FIG. 5. The game player can understand what multiplayer driving is more intuitively via animation content displayed in the first animation 504.

According to an embodiment, when the first display area is selected, the first animation instead of the first picture in the first operation flow is played, thereby reducing the difficulty of understanding the game guidance.

In a solution, after the playing a first animation in the first display area, the method further includes switching from playing the first animation to displaying the first picture in the first display area when the first display area changes from being selected to being unselected.

After the first animation is played in the first display area, playing the first animation is switched to displaying the first picture in the first display area when the first display area changes from being selected to being unselected. That the first display area changes from being selected to being unselected may include, but is not limited to, at least one of the following: triggering the selection instruction on a specific area or button, and triggering the selection instruction in a display area out of the first display area, and the like.

Figure 6:
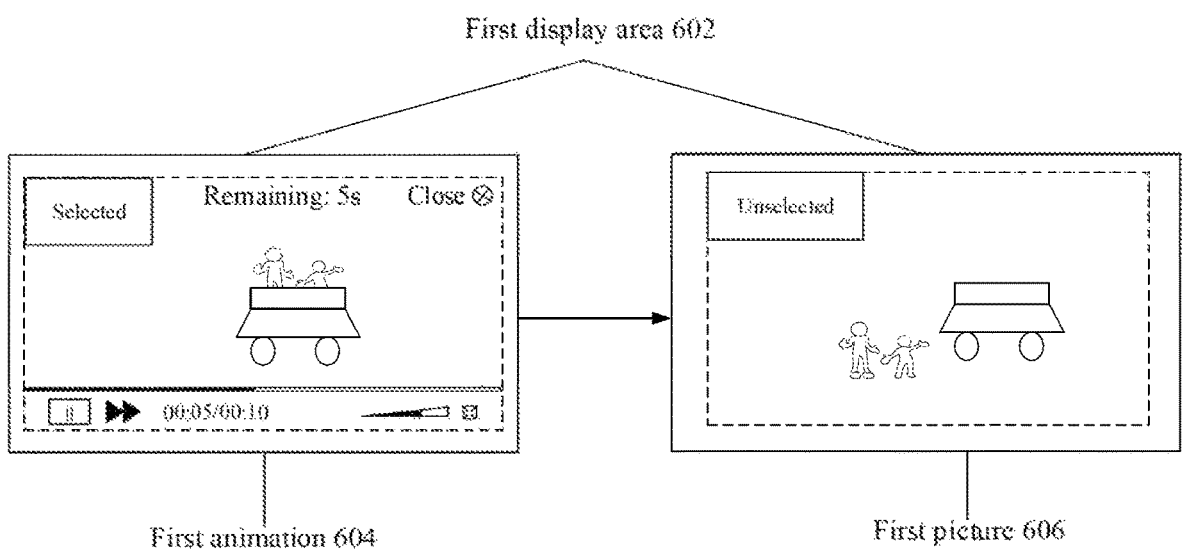
FIG. 6 is a schematic diagram of another animation display method according to an embodiment of this disclosure.

For a further example, as shown in FIG. 6, in a scenario in which the first animation 604 is played in a first display area 602, playing a first animation 604 is switched to displaying a first picture 606 in the first display area 602 when, but not limited to, the selection instruction triggered on a close button (e.g., an icon with a round shape and a cross interior annotated with a word "close" shown in FIG. 6) is detected.

According to an embodiment, when the first display area changes from being selected to being unselected, playing the first animation is switched to displaying the first picture in the first display area, thereby improving display diversity.

In a solution, the playing a first animation in the first display area when the first display area is selected includes playing the first, animation circularly in the first display area when the first display area is selected.

The first animation is played circularly in the first display area when the first display area is selected.

Figure 7:
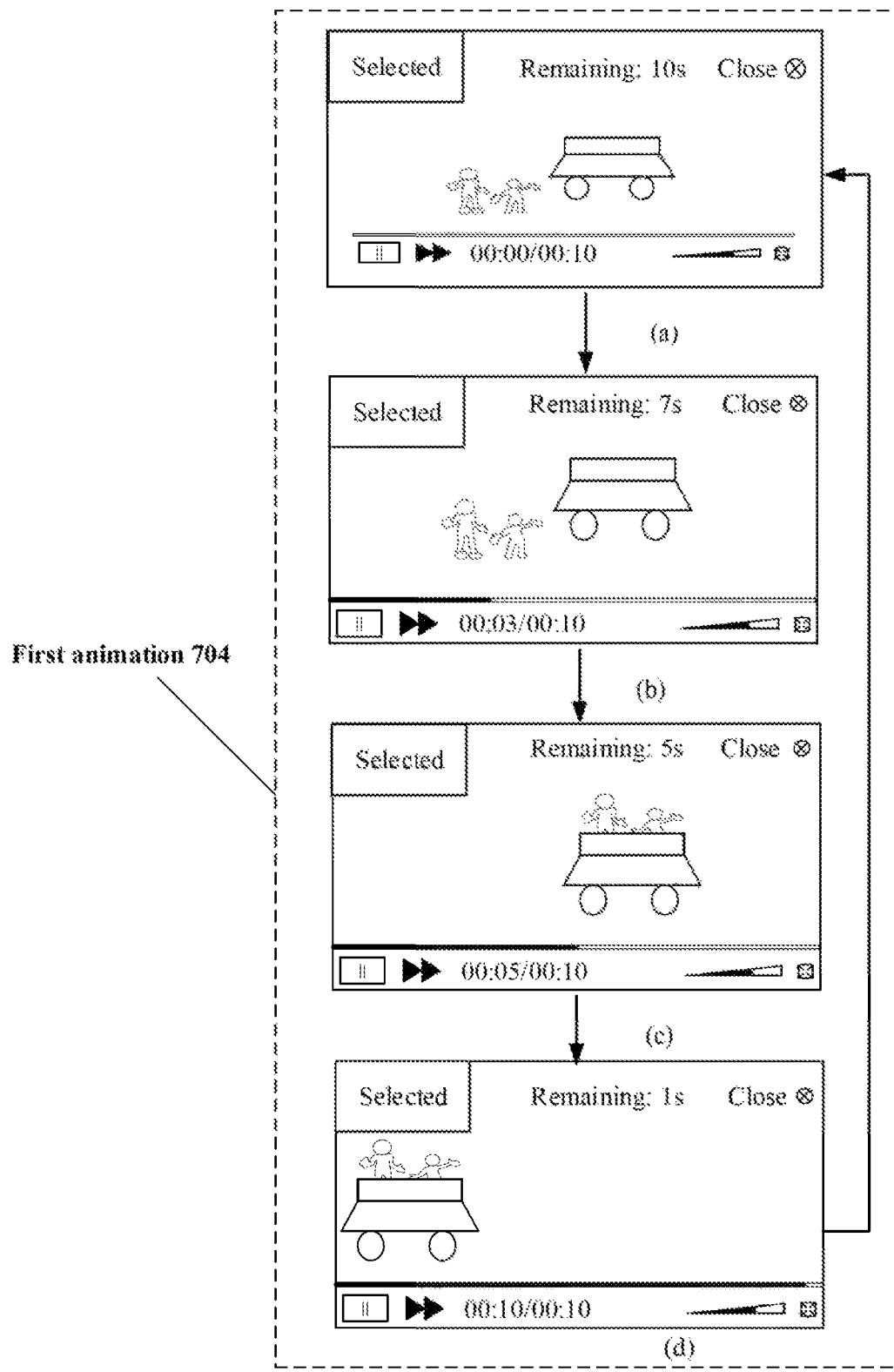
FIG. 7 is a schematic diagram of another animation display method according to an embodiment of this disclosure.

For a further example, it may be, but is not limited to, shown in FIG. 7 when the first display area is selected. A play order of a group of display pictures of a first animation 704 is: (a) to (d). The order can be continuously repeated in some embodiments. In other words, as long as the first display area is selected, the group of display pictures of the first animation 704 are kept being played circularly in the play order.

According to an embodiment, when the first display area is selected, the first animation is played circularly in the first display area, that is, the first animation is played circularly, thereby strengthening the game guidance.

In a solution, the method further include a plurality steps.

In a first step, a second display area is displayed on the setting interface during displaying of the first display area on the setting interface of the target game application, the second display area being used for displaying a second operation flow in the target game application.

In a second step, a second picture is displayed in the second display area when the second display area is unselected, the second picture being at least one display picture in the second operation flow.

In a third step, a second animation is played in the second display area when the second display area is selected, the second animation being used for playing at least one group of display pictures in the second operation flow.

When the first display area is displayed on the setting interface of the target game application, the second display area is displayed on the setting interface; the second picture is displayed in the second display area when the second display area is unselected; and the second animation is played in the second display area when the second display area is selected. The first display area and the second display area may, but is not limited to, be allowed or not allowed to be displayed simultaneously.

Figure 8:
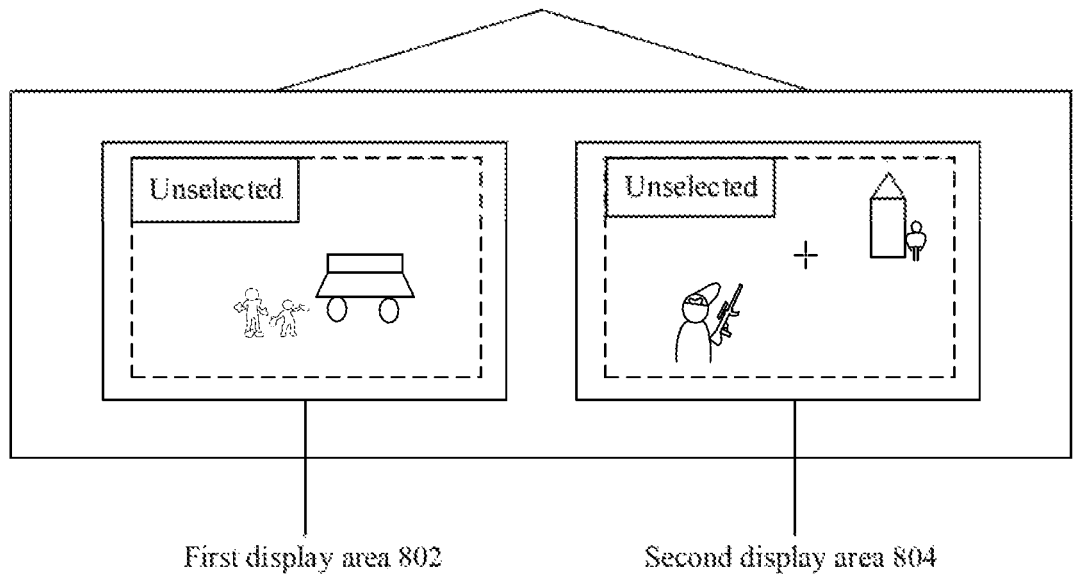
FIG. 8 is a schematic diagram of another animation display method according to an embodiment of this disclosure.

For further example, the first display area and the second display area are displayed simultaneously on the setting interface of the target game application. As shown in FIG. 8, a first display area 802 and a second display area 804 are displayed simultaneously and in parallel on a setting interface 806 of the target game application.

According to an embodiment, the first display area and the second display area are displayed simultaneously on the setting interface of the target game application, thereby increasing display efficiency of the setting interface of the target game application.

In a solution, the playing a second animation in the second display area when the second display area is selected includes playing the second animation circularly in the second display area when the second display area is selected.

The second animation is played circularly in the second display area when the second display area is selected.

Figure 9:
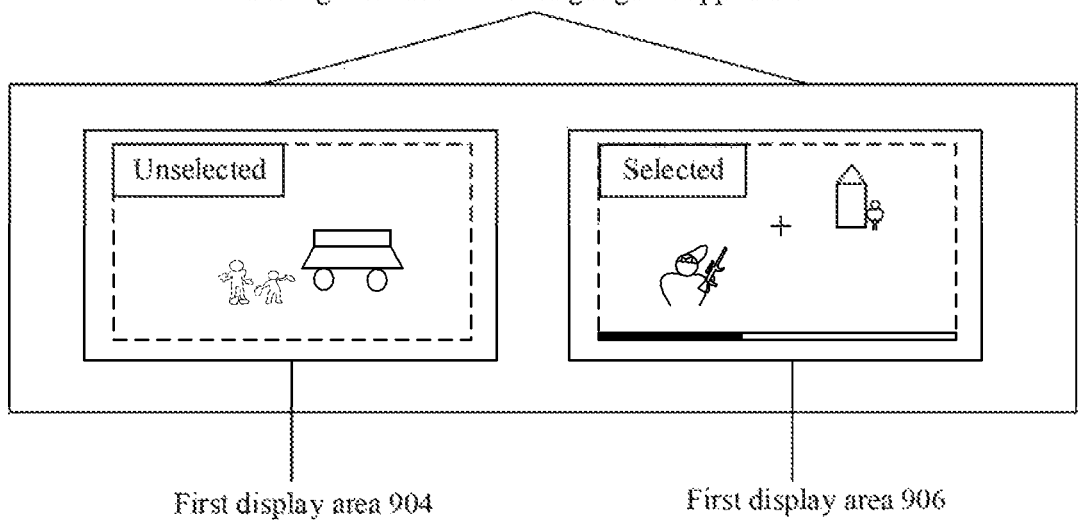
FIG. 9 is a schematic diagram of another animation display method according to an embodiment of this disclosure.

For a further example, as shown in FIG. 9, on a setting interface 902 of the target game application, a first display area 904 and a second display area 906 are displayed in parallel, and the second animation is played circularly in the second display area 906 when the second display area 906 is selected, where the second animation may include, but is not limited to, representing a progress of playing a group of display pictures of the second animation in a form of a progress bar.

According to an embodiment, the second animation is played circularly in the second display area when the second display area is selected, and the second animation is played circularly when the first display area and the second display area are displayed in parallel, thereby increasing play efficiency of the setting interface of the target game application.

In a solution, when the first animation is played in the first display area and the second picture is displayed in the second display area, the method further includes obtaining a first selection operation on the setting interface, the first selection operation being used for selecting the second display area and setting the first display area as unselected.

The first selection operation is obtained on the setting interface, the first selection operation being used for selecting the second display area and setting the first display area as unselected.

For a further example, when the first selection operation is used for selecting the second display area, regardless of the state (unselected or selected) of the first display area, the first display area is set in an unselected state and the second display area is set in a selected state.

According to an embodiment, the first selection operation is used for selecting the second display area, the first display area is set as unselected, and the animation is prevented from being displayed in the first display area and the second display area simultaneously, thereby reducing a probability of an incorrect operation of selecting the display area.

In a solution, when the first picture is displayed in the first display area and the second animation is played in the second display area, the method further includes obtaining a second selection operation on the setting interface, the second selection operation being used for selecting the first display area and setting the second display area as unselected.

The second selection operation is obtained on the setting interface, the second selection operation being used for selecting the first display area and setting the second display area as unselected.

For a further example, when the second selection operation is used for selecting the first display area, regardless of the state (unselected or selected) of the second display area, the second display area is set in an unselected state and the first display area is set in a selected state.

According to an embodiment, the second selection operation is used for selecting the first display area, the second display area is set as unselected, and the first display area and the second display area are prevented from being displayed simultaneously, thereby reducing a probability of an incorrect operation of selecting the display area.

For ease of description, the foregoing method embodiments are stated as a series of action combinations. However, a person skilled in the art would understand that this disclosure is not limited to the described sequence of the actions because according to this disclosure, some steps may be performed in another sequence or may be simultaneously performed. In addition, a person skilled in the art would also understand that the embodiments described in this specification are all exemplary embodiments, and the involved actions and modules are merely exemplary and not necessarily required.

Figure 10:
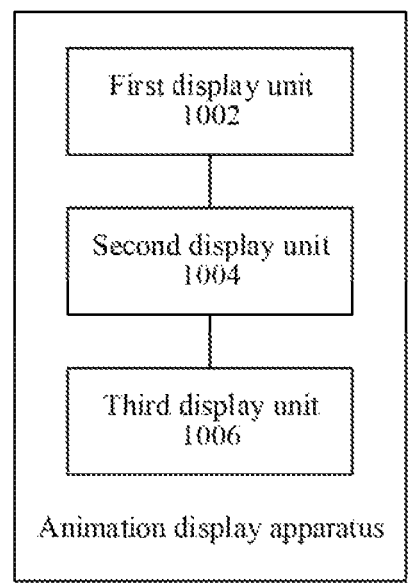
FIG. 10 is a block diagram of an animation display apparatus according to an embodiment of this disclosure.

According to another aspect of the embodiments of this disclosure, an animation display apparatus for implementing the foregoing animation display method is further provided, the apparatus being disposed in an electronic device. As shown in FIG. 10, the apparatus can include a first display unit 1002, a second display unit 1004, a third display unit 1006. One or more modules, submodules, and/or units of the apparatus can be implemented by processing circuitry, software, or a combination thereof, for example.

The first display unit 1002 is configured to display a first display area on a setting interface of a target game application, the first display area being used for displaying a first operation flow in the target game application.

The second display unit 1004 is configured to display a first picture in the first display area in when the first display area is unselected, the first picture being at least one display picture in the first operation flow.

The third display unit 1006 is configured to play a first animation in the first display area when the first display area is selected, the first animation being used for playing at least one group of display pictures in the first operation flow.

In an embodiment, the animation display apparatus is applicable to, but is not limited to, an animation display process of a cloud game application. The cloud game application is a game based on cloud computing. The cloud game application is usually run on a game application server, compresses a corresponding animation in the display area, and directly transmits the compressed animation to a game client through a network, to display the animation to a user object. The animation display apparatus is applicable to, but is not limited to, a process of game guidance, to enable the user object to understand, via the animation display, information to be expressed in the game guidance more intuitively, more detailedly, and more easily, thereby achieving a technical effect of making the game guidance more understandable.

Selecting the first display area may include, but is not limited to, at least one of the following: performing a tap operation on a trigger key in the first display area, performing a tap operation on a blank area of the first display area, or performing a slide operation on a specific area of the first display area. In addition, other trigger manners such as voice trigger and gesture trigger may be included, which are not limited in this embodiment. The trigger key may be set in the first display area by using, but is not limited to, at least one of the following manners: a pop-up window, a floating layer, an embedded area, and the like. The first picture may be, but is not limited to: a related picture of the display picture out of the first animation, the first display picture of the first animation, the last displayed picture of the first animation, and the like. The group of display pictures may include, but are not limited to: a progress bar, a remaining time value, and the like. The first display area may include, but is not limited to: a play area, a display area, a selected area, a pause area, a fast-forward area, a speed-adjustment area, a mute area, a volume-adjustment area, a close area, and the like.

The first display area is displayed on the setting interface of the target game application, and when the first display area is unselected, the first picture is displayed in the first display area; when that the first display area is selected, the first animation is played in the first display area. The target game application may include, but is not limited to: a shooting game, a racing game, a competition game, and the like. The setting interface may include, but is not limited to: a mode setting interface, an operation setting interface, a parameter setting interface, and the like.

For specific embodiments, reference may be made to the example shown in the foregoing animation display apparatus, and details are not described herein again in this example.

According to an embodiment, when the first display area is selected, the first animation instead of the first picture in the first operation flow is played, thereby reducing the difficulty of understanding the game guidance.

In a solution, the apparatus further includes a fourth display unit. The fourth display unit is configured to, after the first animation is played in the first display area, switch from playing the first animation to displaying the first picture in the first display area when the first display area changes from being selected to being unselected.

For specific embodiments, reference may be made to the example shown in the foregoing animation display apparatus, and details are not described herein again in this example.

In a solution, the second display unit 1004 includes a first play module. The first play module is configured to play the first animation circularly in the first display area when the first display area is selected.

For specific embodiments, reference may be made to the example shown in the foregoing animation display apparatus, and details are not described herein again in this example.

In a solution, the apparatus further includes a fifth display unit, a sixth display unit, and a play unit.

The fifth display unit is configured to display a second display area on the setting interface during displaying of the first display area on the setting interface of the target game application, the second display area being used for displaying a second operation flow in the target game application.

The sixth display unit is configured to display a second picture in the second display area when the second display area is unselected, the second picture being at least one display picture in the second operation flow.

The play unit is configured to play a second animation in the second display area when the second display area is selected, the second animation being used for playing at least one group of display pictures in the second operation flow.

For specific embodiments, reference may be made to the example shown in the foregoing animation display apparatus, and details are not described herein again in this example.

In a solution, the play unit includes a second play module. The second play module is configured to play the second animation circularly in the second display area when the second display area is selected.

For specific embodiments, reference may be made to the example shown in the foregoing animation display apparatus, and details are not described herein again in this example.

In a solution, the apparatus further includes a first setting unit. The first setting unit is configured to, when the first animation is played in the first display area and the second picture is displayed in the second display area, obtain a first selection operation on the setting interface, the first selection operation being used for selecting the second display area and setting the first display area as unselected.

For specific embodiments, reference may be made to the example shown in the foregoing animation display apparatus, and details are not described herein again in this example.

In a solution, the apparatus further includes a second setting unit. The second setting unit is configured to, when the first picture is displayed in the first display area and the second animation is played in the second display area, obtain a second selection operation on the setting interface, the second selection operation being used for selecting the first display area and setting the second display area as unselected.

For specific embodiments, reference may be made to the example shown in the foregoing animation display apparatus, and details are not described herein again in this example.

For a specific limitation on the animation display apparatus, reference may be made to the limitation on the animation display method above. Details are not described herein again. The modules in the foregoing animation display apparatus may be implemented entirely or partially by software, hardware, or a combination thereof. The foregoing modules may be built in or independent of a processor of an electronic device in a hardware form, or may be stored in a memory of the electronic device in a software form, so that the processor invokes and performs an operation corresponding to each of the foregoing modules.

Figure 11:
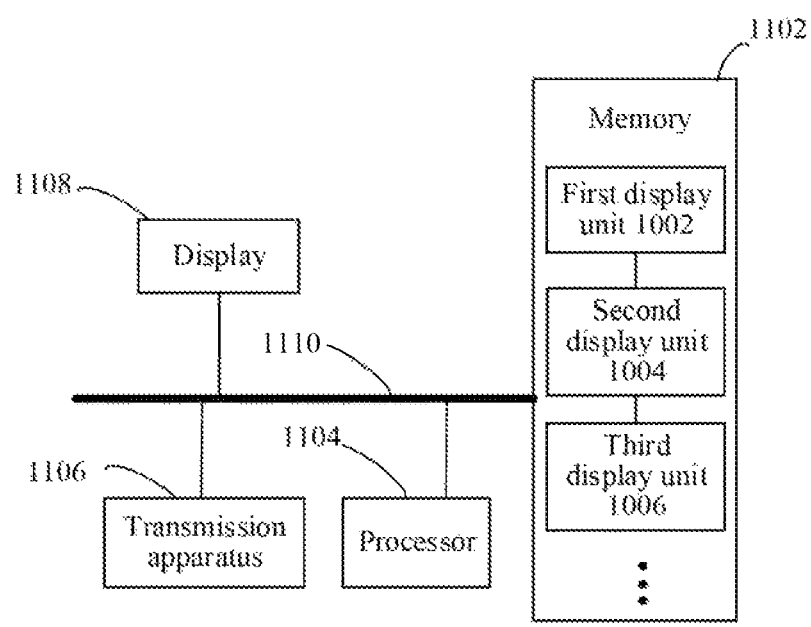
FIG. 11 is a block diagram of an electronic device according to an embodiment of this disclosure.

According to still another aspect of the embodiments of this disclosure, an electronic device configured to implement the foregoing animation display method is further provided. As shown in FIG. 11, the electronic device includes a memory 1102 and one or more processors 1104 (e.g., processing circuitry), the memory 1102 storing computer-readable instructions, and the one or more processors 1104 being configured to perform steps according to any one of the foregoing method embodiments by using the computer-readable instructions.

In an embodiment, the electronic device may be located in at least one of a plurality of network devices in a computer network.

In an embodiment, the one or more processors may be configured to perform the following steps by using the computer-readable instructions.

In a first step, a first display area is displayed on a setting interface of a target game application, the first display area being used for displaying a first operation flow in the target game application.

In a second step, a first picture is displayed in the first display area when the first display area is unselected, the first picture being a display picture in the first operation flow.

In a third step, a first animation in the first display area when the first display area is selected, the first animation being used for playing a group of display pictures in the first operation flow.

A person of ordinary skill in the an may understand that, the structure shown in FIG. 11 is only exemplary. The electronic device may be a terminal device such as a smartphone (e.g., an Android mobile phone or an iOS mobile phone), a tablet computer, a palmtop computer, a mobile Internet device (MID), or a PAD. FIG. 11 does not limit the structure of the electronic device. For example, the electronic device may further include more or fewer components (e.g., a network interface) than those shown in FIG. 11, or have a configuration different from that shown in FIG. 11.

The memory 1102 may be configured to store computer-readable instructions and modules, for example, computer-readable instructions/modules corresponding to the animation display method and apparatus in the embodiments of this disclosure. The one or more processors 1104 perform various functional applications and data processing by running the computer-readable instructions and modules stored in the memory 1102, that is, implementing the foregoing animation display method. The memory 1102 may include a high-speed random access memory, and may also include a non-volatile memory, for example, one or more magnetic storage apparatuses, a flash memory, or another non-volatile solid-state memory. In some examples, the memory 1102 may further include memories remotely disposed relative to the one or more processors 1104, and the remote memories may be connected to a terminal through a network. The foregoing examples of the network include, but are not limited to, the Internet, an intranet, a local area network, a mobile communication network, and a combination thereof. The memory 1102 may be specifically configured to, but is not limited to, store information such as a first display area, a first picture, and a first animation. In an example, as shown in FIG. 11, the memory 1102 may include, but is not limited to, the first display unit 1002, the second display unit 1004, and the third display unit 1006 in the foregoing animation display apparatus. In addition, the memory may further include, but is not limited to, other modules and units in the foregoing animation display apparatus, and details are not described herein again in this example.

A transmission apparatus 1106 is configured to receive or transmit data through a network. A specific example of the network may include a wired network and a wireless network. In an example, the transmission apparatus 1106 includes a network interface controller (NIC). The NIC may be connected to another network device and a router through a network cable, so as to communicate with the Internet or a local area network. In an example, the transmission apparatus 1106 is a radio frequency (RF) module, configured to communicate with the Internet in a wireless manner.

In addition, the electronic device further includes: a display 1108, configured to display information such as the first display area, the first picture, and the first animation, and a connection bus 1110, configured to connect module components in the electronic device.

According to yet another aspect of the embodiments of this disclosure, one or more computer-readable storage media are further provided. The computer-readable storage media store computer-readable instructions, the computer-readable instructions being set to, when run, perform the steps in any one of the foregoing method embodiments.

In this embodiment, the computer-readable storage media may be set to store computer-readable instructions for performing the following steps.

In a first step, a first display area is displayed on a setting interface of a target game application, the first display area being used for displaying a first operation flow in the target game application.

In a second step, a first picture is displayed in the first display area when the first display area is unselected, the first picture being a display picture in the first operation flow.

In a third step, a first animation is played in the first display area when the first display area is selected, the first animation being used for playing a group of display pictures in the first operation flow.

In an embodiment, a person of ordinary skill in the art may understand that all or some of the steps of the methods in the foregoing embodiments may be implemented by computer-readable instructions instructing relevant hardware of a terminal device. The computer-readable instructions may be stored in a computer-readable storage medium (e.g., non-transitory computer-readable storage medium), and the storage medium may include a flash drive, a read-only memory (ROM), a random access memory (RAM), a magnetic disk, a compact disc, and the like.

The sequence numbers of the foregoing embodiments of this disclosure are merely for description purpose, and are not intended to indicate the preference among the embodiments. The "plurality of" in the embodiments of this disclosure is at least two.

When the integrated unit in the foregoing embodiments is implemented in the form of a software functional unit and sold or used as an independent product, the integrated unit may be stored in the foregoing computer-readable storage medium. Based on such an understanding, one or more technical solutions of this disclosure may be implemented in a form of a software product. The computer software product is stored in a storage medium and includes several instructions for instructing one or more computer devices (which may be a PC, a server, a network device, and the like) to perform all or some of steps of the methods in the embodiments of this disclosure.

In the foregoing embodiments of this disclosure, descriptions of the embodiments have different emphases. As for parts that are not described in detail in one embodiment, reference may be made to the relevant descriptions of the other embodiments.

In the several embodiments provided in this disclosure, it is to be understood that the disclosed client may be implemented in another manner. The described apparatus embodiments are merely exemplary. For example, the unit division is merely logical function division, and may use other division manners during actual implementation. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separate, and components displayed as units may or may not be physical units, may be located in one position, or may be distributed on a plurality of network units. Some or all of the units may be selected according to an actual requirement to achieve the objectives of the solutions in the embodiments.

In addition, functional units in the embodiments of this disclosure may be integrated into one processing unit, or each of the units may exist alone physically, or two or more units may be integrated into one unit. The integrated unit may be implemented in a form of hardware such as processing circuitry, or may be implemented in a form of a software function unit.

The foregoing descriptions are merely exemplary implementations of this disclosure. A person of ordinary skill in the art may make some improvements and refinements without departing from the principle of this disclosure and the improvements and refinements should be understood as falling within the protection scope of this disclosure.

What is claimed is:

1. An animation display method, comprising:
   displaying a first display area on a game setting interface of a game application, the first display area being configured to display a first operation flow in the game application;
   displaying a first picture in the first display area when the first display area is not selected, the first picture being at least one display picture in the first operation flow; and
   playing, by processing circuitry, a first animation in the first display area when the first display area is selected, the first animation playing at least one group of display pictures in the first operation flow.

2. The method according to claim 1, wherein after the playing the first animation, the method further comprises:
   switching from playing the first animation to displaying the first picture in the first display area when the first display area changes from being selected by a user to being unselected by the user.

3. The method according to claim 1, wherein the playing the first animation comprises:
   playing the first animation repeatedly in the first display area while the first display area is selected.

4. The method according to claim 1, further comprising:
   displaying a second display area on the game setting interface during displaying of the first display area on the game setting interface of the game application, the second display area being configured to display a second operation flow in the game application;
   displaying a second picture in the second display area when the second display area is not selected, the second picture being at least one display picture in the second operation flow; and
   playing a second animation in the second display area when the second display area is selected, the second animation playing at least one group of display pictures in the second operation flow.

5. The method according to claim 4, wherein the playing the second animation comprises:
   playing the second animation repeatedly in the second display area when the second display area is selected.

6. The method according to claim 4, wherein when the first animation is played in the first display area and the second picture is displayed in the second display area, the method further comprises:
   obtaining a first selection operation on the gaming setting interface, the first selection operation being to select the second display area and unselect the first display area.

7. The method according to claim 4, wherein when the first picture is displayed in the first display area and the second animation is played in the second display area, the method further comprises:
   obtaining a second selection operation on the game setting interface, the second selection operation being to select the first display area and unselect the second display area.

8. The method according to claim 1, wherein the first display area is selected by a user via a user input.

9. The method according to claim 8, wherein
   the first picture illustrates an initial step of a game mode; and
   the at least one display picture includes a plurality of different subsequent pictures of the game mode.

10. An apparatus, comprising:
    processing circuitry configured to:
    display a first display area on a game setting interface of a game application, the first display area being configured to display a first operation flow in the game application;
    display a first picture in the first display area when the first display area is not selected, the first picture being at least one display picture in the first operation flow; and
    play a first animation in the first display area when the first display area is selected, the first animation playing at least one group of display pictures in the first operation flow.

11. The apparatus according to claim 10, wherein the processing circuitry is configured to:
    switch from playing the first animation to displaying the first picture in the first display area when the first display area changes from being selected by a user to being unselected by the user.

12. The apparatus according to claim 10, wherein the processing circuitry is configured to:
    play the first animation repeatedly in the first display area while the first display area is selected.

13. The apparatus according to claim 10, wherein the processing circuitry is configured to:
    display a second display area on the game setting interface during the display of the first display area on the game setting interface of the game application, the second display area being configured to display a second operation flow in the game application;
    display a second picture in the second display area when the second display area is not selected, the second picture being at least one display picture in the second operation flow; and
    play a second animation in the second display area when the second display area is selected, the second animation playing at least one group of display pictures in the second operation flow.

14. The apparatus according to claim 13, wherein the processing circuitry is configured to:
    play the second animation repeatedly in the second display area when the second display area is selected.

15. The apparatus according to claim 13, wherein when the first animation is played in the first display area and the second picture is displayed in the second display area, the processing circuitry is configured to:
obtain a first selection operation on the gaming setting interface, the first selection operation being to select the second display area and unselect the first display area.

16. The apparatus according to claim 13, wherein when the first picture is displayed in the first display area and the second animation is played in the second display area, the processing circuitry is configured to:
obtain a second selection operation on the game setting interface, the second selection operation being to select the first display area and unselect the second display area.

17. The apparatus according to claim 10, wherein the first display area is selected by a user via a user input.

18. The apparatus according to claim 17, wherein
the first picture illustrates an initial step of a game mode; and
the at least one display picture includes a plurality of different subsequent pictures of the game mode.

19. A non-transitory computer-readable storage medium storing instructions which when executed by at least one processor cause the at least one processor to perform:
displaying a first display area on a game setting interface of a game application, the first display area being configured to display a first operation flow in the game application;
displaying a first picture in the first display area when the first display area is not selected, the first picture being at least one display picture in the first operation flow; and
playing a first animation in the first display area when the first display area is selected, the first animation playing at least one group of display pictures in the first operation flow.

20. An electronic device, comprising a memory and one or more processors, the memory storing computer-readable instructions, and the one or more processors being configured to perform the method according to claim 1 when the computer-readable instructions are executed.

* * * * *